(12) United States Patent
Benjamin

(10) Patent No.: US 8,755,204 B2
(45) Date of Patent: Jun. 17, 2014

(54) RF ISOLATION FOR POWER CIRCUITRY

(75) Inventor: Neil Benjamin, East Palo Alto, CA (US)

(73) Assignee: Lam Research Corporation, Fremont, CA (US)

( * ) Notice: Subject to any disclaimer, the term of this patent is extended or adjusted under 35 U.S.C. 154(b) by 415 days.

(21) Appl. No.: 12/603,326

(22) Filed: Oct. 21, 2009

(65) Prior Publication Data

US 2011/0090719 A1 Apr. 21, 2011

(51) Int. Cl.
*H02M 5/45* (2006.01)
(52) U.S. Cl.
USPC .................. 363/37; 219/121.43; 336/84 M
(58) Field of Classification Search
USPC ........... 363/34, 37; 307/2–3; 336/84 R, 84 C, 336/84 M; 219/121.43, 121.58
See application file for complete search history.

(56) References Cited

U.S. PATENT DOCUMENTS

| | | | | |
|---|---|---|---|---|
| 4,510,476 | A | * | 4/1985 | Clatterbuck et al. ......... 336/84 C |
| 5,134,344 | A | * | 7/1992 | Vos et al. ...................... 315/239 |
| 5,864,110 | A | * | 1/1999 | Moriguchi et al. ...... 219/121.57 |
| 6,028,413 | A | * | 2/2000 | Brockmann .................. 320/108 |
| 6,235,646 | B1 | | 5/2001 | Sharan et al. |
| 6,429,762 | B1 | * | 8/2002 | Shusterman et al. ....... 336/84 R |
| 6,922,324 | B1 | * | 7/2005 | Horwitz ........................ 361/234 |
| 2003/0205295 | A1 | * | 11/2003 | Yoshida et al. ............... 148/108 |
| 2007/0204907 | A1 | * | 9/2007 | Strang ............................... 137/2 |
| 2010/0020463 | A1 | * | 1/2010 | Nasman et al. ............... 361/234 |

FOREIGN PATENT DOCUMENTS

| | | |
|---|---|---|
| JP | 7032078 | 4/1995 |
| KR | 10-2006-0094465 | 8/2006 |
| KR | 10-2009-0013626 | 2/2009 |

OTHER PUBLICATIONS

"International Search Report", PCT Application No. PCT/US2010/053263, Mailing Date: Jun. 24, 2011.
"Written Opinion", PCT Application No. PCT/US2010/053263, Mailing Date: Jun. 24, 2011.
"International Preliminary Report on Patentability", PCT Application No. PCT/US2010/053263, Mailing Date: May 3, 2012.

* cited by examiner

*Primary Examiner* — Harry Behm
(74) *Attorney, Agent, or Firm* — Martine Penilla Group, LLP

(57) ABSTRACT

System and method for providing isolated power to a component that is also subject a set of RF signals that includes at least a first RF signal having a first RF frequency is provided. There is included providing a DC voltage signal and modulating the DC voltage signal into an isolated power signal using an isolation transformer. The isolated power signal has an intermediate frequency that is higher than 60 Hz and lower than the first RF frequency. There is included supplying the DC voltage signal to the primary winding and obtaining the isolated power signal from the secondary winding; and delivering the isolated power to the component using the isolated power signal.

17 Claims, 5 Drawing Sheets

RF ISOLATION FOR POWER CIRCUITRY

BACKGROUND OF THE INVENTION

Plasma has long been employed to process substrates (e.g., wafers) into semiconductor products, such as integrated circuits. In many modern plasma processing systems, a substrate may be placed onto an RF chuck for plasma processing inside a plasma processing chamber. The RF chuck may be biased with an RF signal, using RF voltages in the range from tens to thousands of volts and RF frequencies in the range from tens of KHz to hundreds of MHz. Since the RF chuck also acts as a workpiece holder, proper control of the RF chuck temperature is an important consideration to ensure repeatable process results.

Generally speaking, the RF chuck's temperature is maintained by one or more electric heaters, which may be integrated or coupled with the RF chuck. Electrical power to the electric heater is typically obtained from line AC voltage via an appropriate control circuit to maintain the RF chuck at a desired temperature range. By way of example, the electric heater may be powered by DC, line frequency (e.g., 50/60 Hz AC) or KHz range AC power.

In this configuration, the DC/low frequency power needs to be coupled to the RF chuck assembly, which is also simultaneously subject to substantial levels of RF power either by stray coupling or by direct connection. To prevent an undesirable apparent RF short to ground, loss of RF power and high levels of signal interference, even damage via the electric heater power supply and/or control circuitry, RF isolation is required.

To facilitate discussion, FIG. 1 shows relevant portions of an example system that employs AC line (e.g., 50/60 Hz) voltages or DC voltages to power a heater or other load circuits at the RF hot or "high side". Referring to FIG. 1, AC line voltages or DC voltages are supplied via leads 102 and 104 to RF filter circuit 106. RF filter circuit 106 is shown to be a single-channel (includes 2 wires for 1 complete circuit, to power 1 heater zone), dual-frequency filter and may include L-C circuits of a known design to present a high impedance to RF frequencies of interest (e.g., 2 MHz and 13.5 MHz) such that a relative RF short to ground via leads 102 and 104 and any attached circuitry, e.g. heater control/powering circuitry is effectively prevented. For illustration purposes, these RF frequencies are coupled to heater 114 via lead 116 as shown. In the example of FIG. 1, 114 is the load including the heater and high side control circuitry. On the other hand, 116 represents a leakage path, such as stray capacitance that would allow RF from the plasma or applied to the chuck to flow back via the heater load, for example, RF filter 106 may have different designs and multiple stages to handle a wide range of discrete RF frequencies. The operation of RF filter 106 in its various implementations is basically known technology and will not be elaborated here.

Filter outputs 110 and 112 provides power to a load, e.g. heater, 114. A control circuit (not shown) may be coupled to leads 102 and 104 to turn on/off the input AC line voltages or DC voltages to control the temperature of an RF chuck, for example. The control may be performed in a proportional or in a binary on/off manner. Temperature sensing of the RF chuck may be employed as a feedback signal to the control circuit, for example.

When RF filters are employed to provide RF isolation in a high power, high RF frequency application, several drawbacks are encountered. The high RF frequency (e.g., in the MHz range) necessitates the use of large air core inductors in some designs, rendering the filtering circuit bulky. Furthermore, the goal is to maintain a sufficiently high input impedance (when viewed from the RF hot direction) across all the frequencies of interest. RF isolation design is complicated, however, by the filet that some plasma processing systems employ RF frequency tuning during processing. RF frequency tuning employs a range of frequencies during operation, thus making the RF isolation filter design significantly more challenging and complex due to the need to handle variable RF frequencies (and hence a wide range of RF impedances) and the desire to maintain system-to-system RF impedance and attenuation consistency. Even if an RF isolation filter design can handle a wide range of operating frequencies (fundamentals as well as their harmonics) and can be carefully matched to provide acceptable system-to-system uniformity with respect to RF isolation, care must still be taken to avoid high voltage discharge or arcing/breakdown and excessive heat generation or power dissipation may still be problematic. The design task is seriously complicated by the magnitude of the RF signal, which may be up to the range of thousands oh volts and up to the range of thou of watts.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
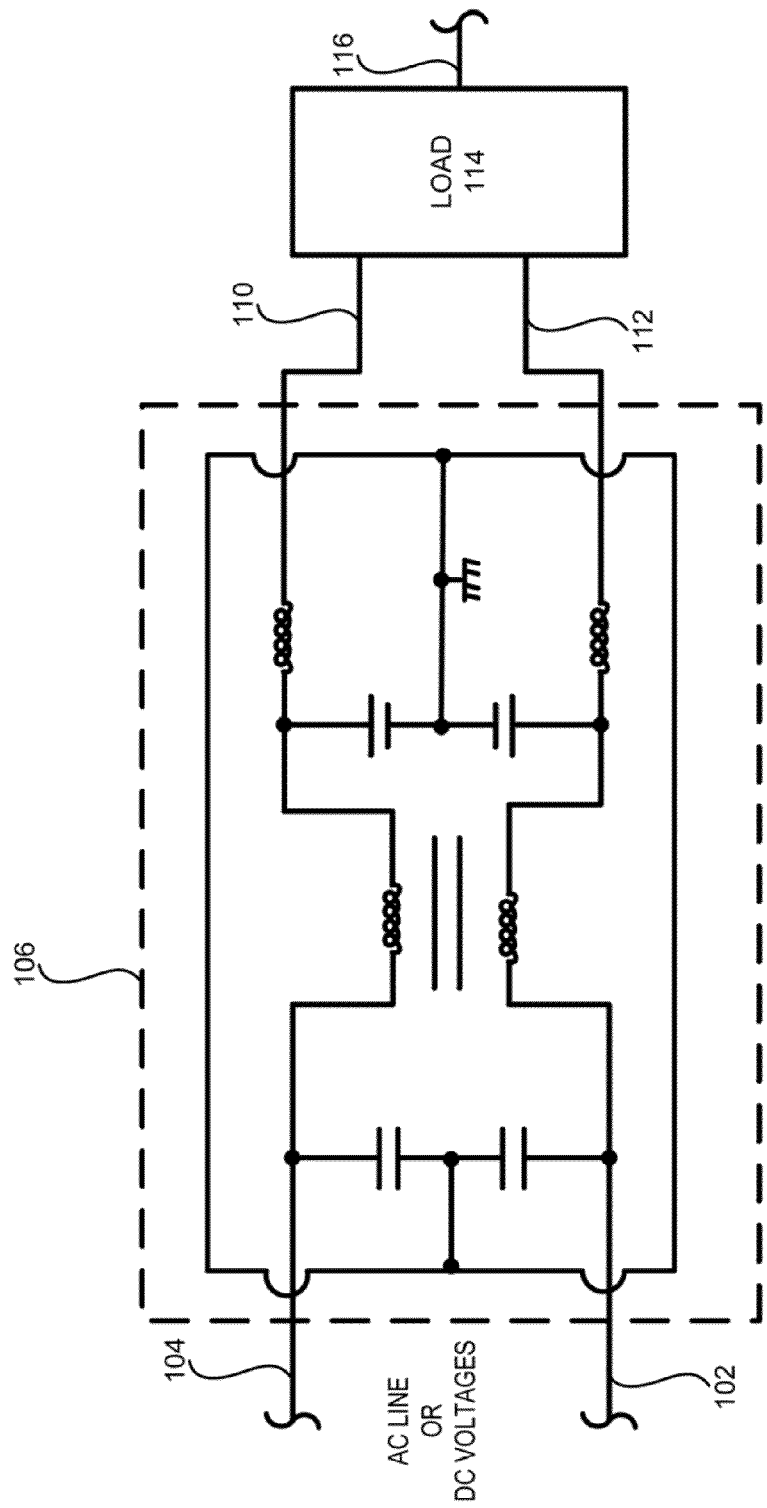
FIG. 1 shows relevant portions of an example prior art system that employs AC line (e.g. 50/60 Hz) voltages or DC voltages to power a heater or other load circuits.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without sonic or all of these specific details. In other instances, well known process steps and/or structures have not been described in detail in order to not unnecessarily obscure the present invention.

Embodiments of the invention employ an innovative approach to RF isolation in a high power, high frequency environment in one or more embodiments of the invention, an AC source power signal is rectified into a DC power signal then modulated into an intermediate frequency power signal to be supplied to the primary winding of an isolation transformer. As the term is employed herein, the DC power signal may be a true DC power signal (i.e., having no frequency or ripple component similar to that supplied by a battery) or a rectified DC power signal (which may have some ripple components typical of DC signals rectified from AC signals). Being an isolation transformer, there is no direct electrical connection between the primary and the secondary windings of the isolation transformer. Instead, an isolated power signal having the intermediate frequency is generated across the secondary winding of the isolation transformer via mutual inductance.

The use of an intermediate frequency, which is intentionally chosen to be higher than AC line frequencies (e.g., 50 Hz or 60 Hz) but typically lower than the RF frequency to be blocked, and preferably lower than the lowest of the RF frequencies to be blocked if multiple high frequencies RF signals are involved, renders it possible to reduce the size of the isolation transformer while innovative techniques are employed to reduce the primary-to-secondary capacitive coupling, as well as to reduce the secondary-to-core capacitive coupling.

In one or more embodiments of the invention, the intermediate frequency of the power signal supplied to the primary winding, of the isolation transformer is in the range of about 500 Hz to about 2 MHz, more preferably in the range of about 5 KHz to about 200 KHz, and in a preferred embodiment in the range of about 10 KHz to about 50 KHz. The selection of the appropriate intermediate frequency is critical since a lower operating frequency tends to result in an undesirably large isolation transformer and a higher frequency tends to enable a reduction in the size of the magnetic components (e.g., the isolation transformer) while the drive circuit and the magnetic core material tend to become less efficient at higher operating frequencies.

In one or more embodiments of the invention, the isolation transformer is specifically designed with reduced dimensions and to operate efficiently at the aforementioned intermediate frequency range while presenting a high impedance to high frequency signals at all RF frequencies of interest. As mentioned, in one or more embodiments, the secondary winding is physically spaced apart from the primary winding to reduce capacitive coupling. In a preferred embodiment, the secondary winding is spaced as far as possible from the primary winding to minimize this capacitive coupling. In one or more embodiments, the secondary winding is wound with a large diameter, resulting in an air gap between the secondary winding and the magnetic core, thereby reducing the capacitive coupling between the secondary winding and the core. In one or more embodiment, the secondary winding is wound over the primary winding but with a larger diameter, thereby reducing the capacitive coupling between the primary winding and the secondary winding, as well as reducing the capacitive coupling between the secondary winding and the core. If desired, one or more shields may be interposed between the secondary winding and the primary winding, between the secondary winding and the core, and/or between the primary winding and the core to control the capacitive coupling, such shields being slotted in a fashion known as a Faraday shield in art to minimize the induction of eddy currents in the shield.

Figure 2:
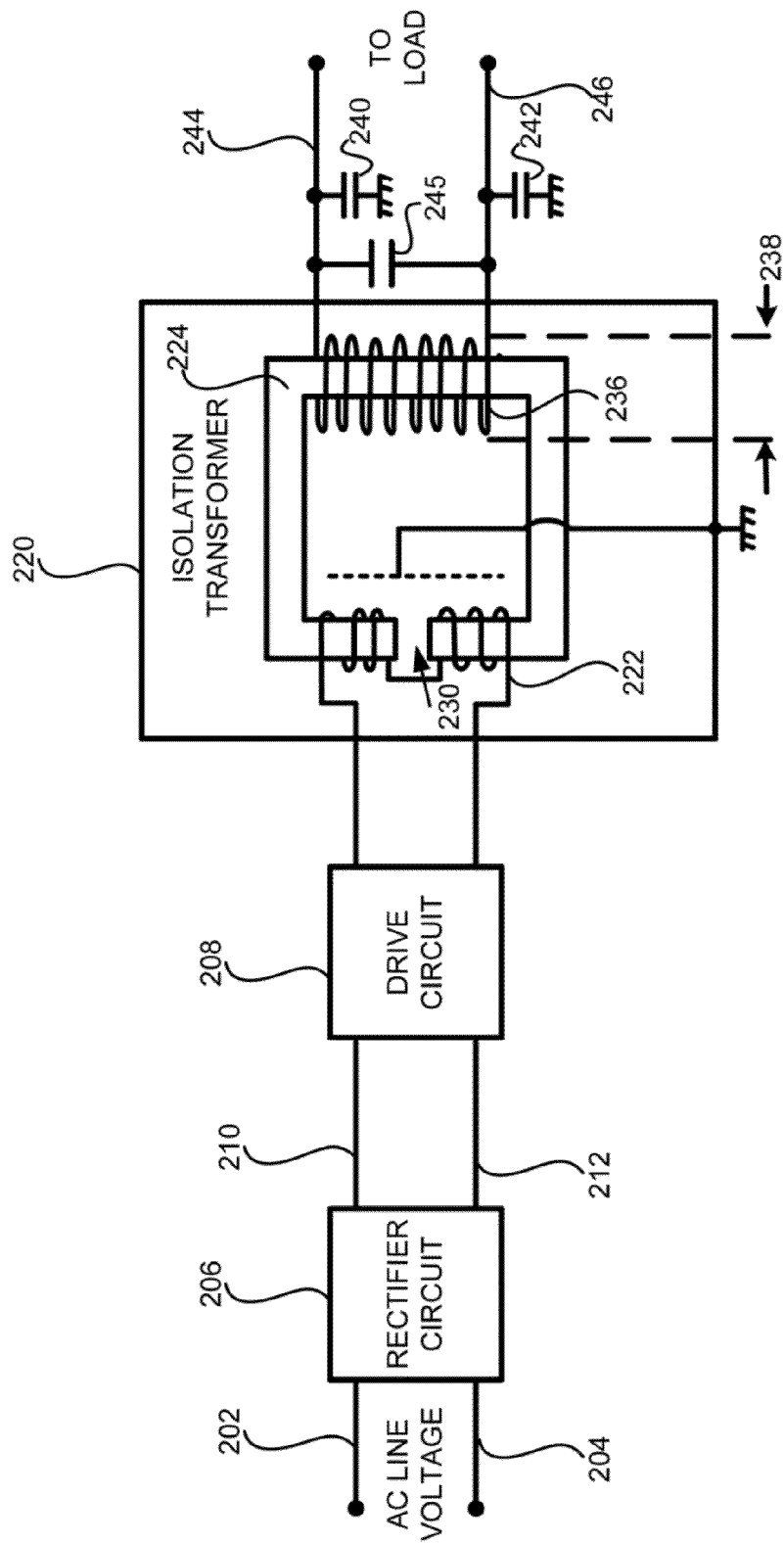
FIG. 2 shows, in accordance with an embodiment of the present invention, relevant portions of an isolation transformer implementation to provide high DC or intermediate frequency AC power to a load that is also coupled to one or more high frequency RF signals.

The features and advantages of embodiments of the invention may be better understood with reference to the figures and discussions that follow. FIG. 2 shows, in accordance with an embodiment of the present invention, relevant portions of an isolation transformer implementation to provide high DC or AC line power to a load that is also coupled to one or more high frequency RF signals. In the example of FIG. 2, the load is a heater for an RF coupled chuck in a plasma processing chamber although other loads may also benefit from embodiments of the invention.

With respect to FIG. 2, a source power signal in the form of AC line voltages and frequencies (e.g., 50 Hz or 60 Hz) is supplied via leads 202 and 204 to a rectifier/filter circuit 206. Rectifier circuit 206, which may be implemented by a bridge rectifier and/or may employ triac, SSR, or thyristor controls, converts the AC line input power signal to a quasi-DC power signal which may be subsequently filtered into smooth. DC if desired. In the example of FIG. 2, the AC source power signal on leads 202/204 may be a single phase signal or a 3-phase signal as desired, and rectifier circuit 206 is correspondingly a single-phase or three-phase rectifier. If a DC power signal is available as input power, then no rectification may be necessary. It should be noticed that the high current drawn from the AC line into the input filter may require the power factor correction circuitry.

The DC power signal output by rectifier circuit 206 is then supplied to a drive circuit 208, which converts the DC power signal received on leads 210 and 212 to an intermediate signal having an intermediate frequency. The intermediate frequency is in the range of about 10 KHz to about 1 MHz, more preferably in the range of 10 KHz to a few hundred KHz, and in an embodiment in the range of about 10 KHz to about 200 KHz. As such, the intermediate frequency is intentionally higher than the AC line frequency of 50-60 Hz but preferably lower than the RF frequency to be blocked (which tends to be in the multiple MHz range). Being higher than the AC line frequency, the intermediate frequency renders it possible to use a smaller isolation transformer 220. In one or more embodiments, drive circuit 208 is a switch-mode power supply, which pulse-width modulates the received. DC power signal to the desired intermediate frequency. In one or more embodiments, the duty cycle after pulse-width modulation may vary from slightly above zero to about 50%. If desired, an appropriate drive circuit 208 may modulate the received DC power signal to an AC sine signal having an intermediate frequency. Reducing the harmonic content in this fashion can prevent interference and noise issues and simplifies any filtering requirements. Alternate power modulation schemes including zero crossing and on/off control may also be implemented either solo, or in combination.

The intermediate signal output by drive circuit 208 is then supplied to the primary winding 222 of isolation transformer 220. Primary winding 222 is shown wound around one segment of a core 224. Core 224 may be formed of manganese zinc or nickel zinc or another suitable high magnetic permeability material (e.g., mu in the 2000 range). Alternatively, powdered iron (mu of 10 to 40), core materials commonly known as MPP, Sendust (mu of 50 to 300), NiZn and MnZn ferrites (mu of 100 to 5000), etc., may be employed. In general, materials having a higher mu may be employed for lower frequency operation and vice versa. For power application between 20 KHz and 2 MHz, materials with a mu value between about 200 to about 3000 may be suitable, in an embodiment in an embodiment, materials having a nm range value between about 10 to about 5000 may be employed. In an embodiment, materials having a mu range value between about 100 to about 2000 may be employed, in an embodiment, materials having a mu range value between about 200 to about 1000 may be employed.

In one or more embodiments, an air gap 230 (the location shown in FIG. 2 is only an example) may be provided in core 224 to prevent, saturation and to linearize the magnetic characteristics as well as potentially reduce the temperature dependency of isolation transformer 220. If air gap 230 is present, primary winding 222 is preferably wound to the sides of the air gap 230 instead of over air gap 230 to reduce dissipation in the winding.

Secondary winding 236, which is not directly coupled to primary winding 222 by conduction, is also wound around core 224. In one or more embodiments, to reduce capacitive coupling between primary winding 222 and secondary winding 236, secondary winding 236 is positioned apart from primary winding 222 to reduce the primary-to-secondary capacitive coupling and to achieve a high degree of isolation, particularly for the higher frequency RF signals. For example, secondary winding 236 may be positioned opposite primary winding 222 around core 224 as shown. Although this separation of the windings may result in considerable leakage inductance, appropriate designs can readily accommodate this issue.

Generally speaking, it is preferable that the RF coupling be mostly by stray capacitance providing the core material is a dielectric. Ferrite materials are metal oxides with high resistance and dielectric constants typical of other ceramics, say 10-100, may be employed to achieve capacitance between the primary and secondary sides of a few pica farads. However certain termites such as the common MnZn materials may have dielectric constants orders of magnitude higher such that secondary insulation such as airgaps on Teflon liners may be required to control stray capacitance. For example, in one or more embodiments, the capacitive coupling is preferably limited to the single-digit picofarad range (such as 1 pF to about 20 pF).

In one or more embodiments, the choice of the core material and design of the core involves tradeoffs, for while epsilon both real and imaginary typically decreases somewhat with increasing frequency for ferrites, thus lowering the stray capacitance, the loss tangent still suffers a maximum at some particular frequency and it is desirable that the power transmission be operated well below this frequency in order to avoid excessive core loss. The stray capacitance tends to be somewhat independent of frequency, but lowers as frequency is increased such that isolation improves at higher frequencies so the particulars of the RF in use tend to not matter as long as the high frequency RF signal is applied in a common mode (no net Mix in the core). Thus this approach potentially offers a universal solution across all frequency ranges and produces far less broadband loading than the filters currently in use. While it is in general true that the RF blocking is universal and broadband, care should be taken in the design of the coils and transformer to prevent the accidental introduction of resonant antenna circuits such that the impedance would be unacceptably lowered at particular frequencies. It should further be arranged that these frequencies if any do not coincide to the RF frequencies applied.

In one or more embodiments, secondary winding 236 is wound around core 224 with a larger diameter 238 when compared to the manner with which primary winding 222 is wound around core 224. The larger diameter 238 helps to reduce the secondary-to-core capacitive coupling. In one or more embodiments (not shown in FIG. 2), secondary winding 236 is wound over primary winding 222, with a larger diameter to reduce the secondary-to-primary capacitive coupling as well as to reduce the secondary-to-core capacitive coupling. The reduction in these capacitive couplings reduces the frequency dependency and is an important aspect of some embodiments of the present invention.

In contrast, primary winding 222 tends to be wound closer to core 224 to help reduce the leakage inductance. To reduce turn-to-turn or turn-to-core capacitance (which may, in some cases, contribute to self-resonance), a small gap and/or an insulating layer may be interposed between primary winding 222 and core 224.

Secondary winding 236 may have a 1:1 ratio with primary winding 222 or may have an n:1 winding relationship with primary winding 222 to step up or down the voltage. Higher voltage, lower current power signals tend to be more efficient for transmission purposes and may be desired in some cases, in a preferred embodiment, 208 volt AC may be rectified to over 300 volts DC for operational use. Via mutual inductance, an isolated power signal having the intermediate frequency is generated across secondary winding 236. The isolated power signal having the intermediate frequency, which is output by isolation transformer 220, may then be employed to drive the load, or may be converted to an isolated DC power signal to drive the load. If desired, output filtering may be performed prior to driving the load with the isolated power signal.

In one or more embodiments, a shield is provided to further reduce the capacitive coupling. For example, a shield may be provided between primary winding 222 and secondary winding 236 to reduce the primary-to-secondary capacitive coupling. As another example, a shield may alternatively or additionally be provided between secondary winding 236 and core 224 to reduce the secondary-to-core capacitive coupling. As yet another example, a shield may alternatively or additionally be provided between primary winding 222 and core 224 to reduce the primary-to-core capacitive coupling. The shield may be grounded, in one or more embodiments, to conduct any current developed thereon to ground. However, the detailed design and geometry selected should take care to avoid significantly increasing the secondary to ground capacitance. In one or more embodiments, one or more slits are provided in the shield (e.g., in the toroidal winding direction) to reduce eddy currents and prevent the shield from acting like a shorted turn. The presence of the shield has been found to reduce self-resonance antenna effect) in the primary and secondary windings, thereby smoothing out the impedance characteristics and contributing to the frequency-independent characteristic of the design.

In one or more embodiments, filters may be employed to allow the high frequency RF signal (i.e., the RF signal to be blocked) to be presented to isolation transformer 220 as a common mode signal. In the example of FIG. 2, capacitor 245 is coupled to leads 244 and 246 respectively to accomplish the goal of presenting the high frequency RF signal to isolation transformer 220 as a common mode signal. Filters of other designs well known to those skilled in the art may also be employed. While there may be stray capacitances (represented by 240 and 242), these stray capacitances may be dominated by capacitor 245 for the purpose of insuring that the output signal RF coupling is common mode signal. Capacitor 245 should be appropriately sized (not too large) to avoid resonating at critical frequencies.

Once the power is transferred across the RF isolation (transformer) h can be used to power a passive circuit such as a heater directly, either as AC at the switching frequency, or rectified into deeply modulated DC or filtered back to smoothed DC. It may also be rectified or controlled at the high side if desired.

In one or more embodiments, power control is applied at the low side (e.g., primary winding 222 and circuitry toward the AC line side of FIG. 2) using for example SSRs as is currently done for heaters, or by PWM (pulse width modulation) or by ON/Off burst modulation of the switching circuit. The control scheme may implement open loop, feed forward, or feed back control.

Feedback can be implemented by monitoring low side power/current draw, or more accurately using a high side electrical sensor of power, voltage and or current or some other sensed variable. In the case of a beater, a temperature sensor may be employed, e.g. a resistance temperature detector, fluoro-optic probe or thermocouple. In the event that the high side sensor is electrical, another isolation channel may be provided, e.g. opto-coupler or optic fiber or low current RF filter. Furthermore, modulation may be performed on the AC or DC isolated power signal on the high side to enable high-side control.

In the low side control scheme, each high side device (e.g. heater element) may employ its own power channel. As an alternative it is possible to isolate the power to the high side using a common power channel, which can either be an even larger power isolator (transformer), or by running several lower power channels in parallel. In this case, the control may be implemented using active circuitry at the high side. The control signals corresponding to a set point (e.g. temperature or power) may also be from the low side and may be isolated (e.g., using opto-coupling).

Figure 3A:
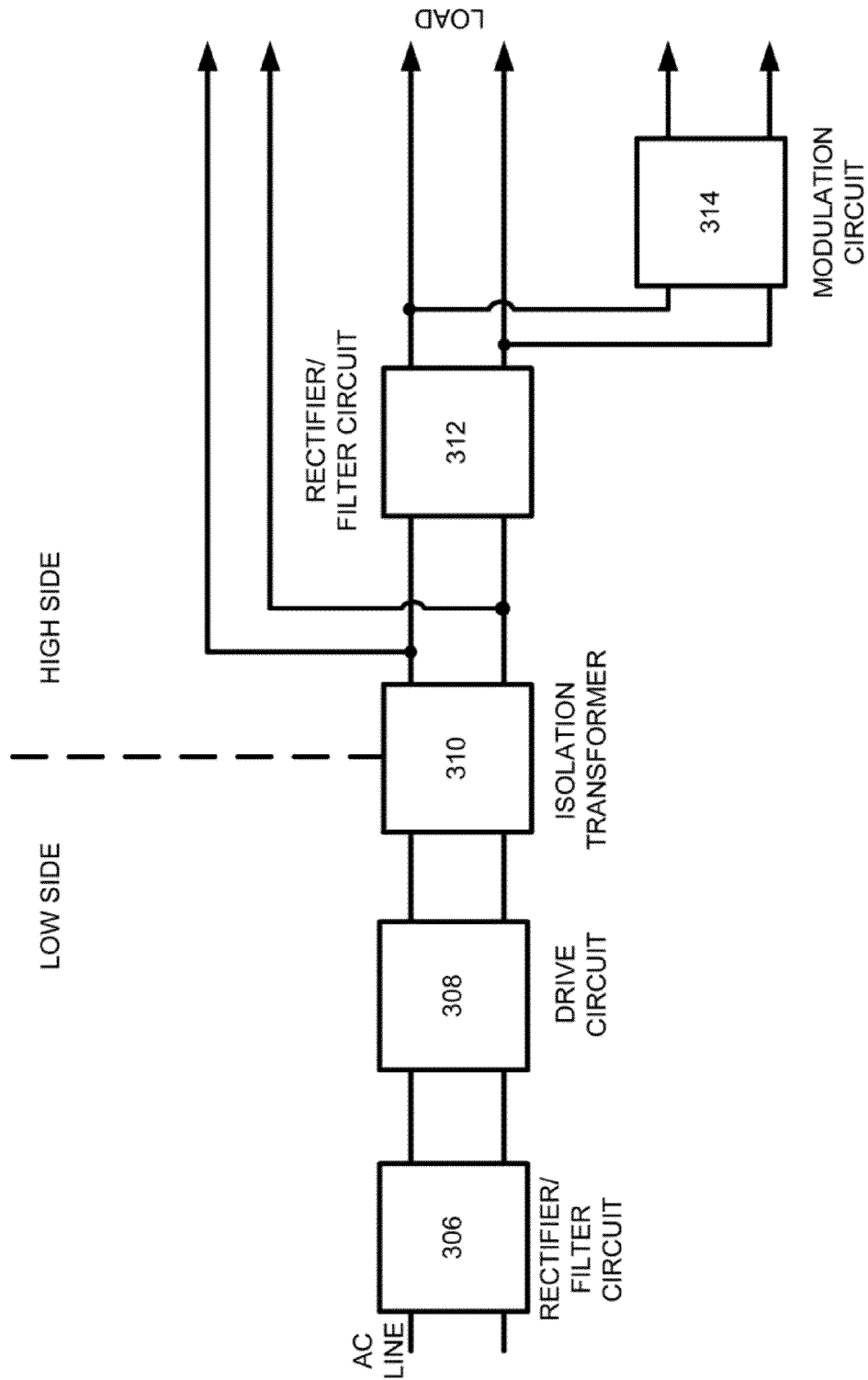
FIGS. 3A-3C show, in accordance with embodiments of the invention, some example control schemes.
Figure 3B:
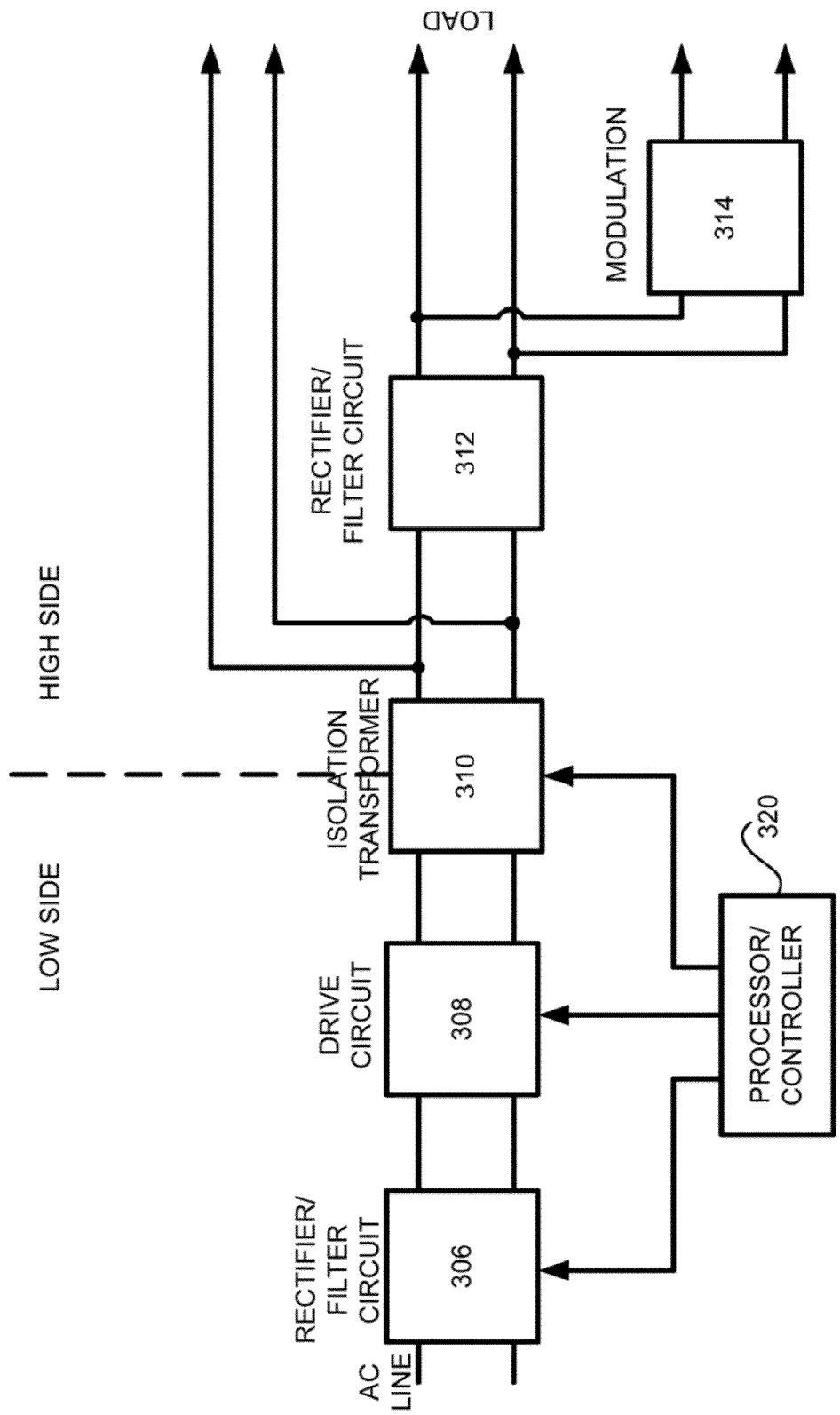
Figure 3C:
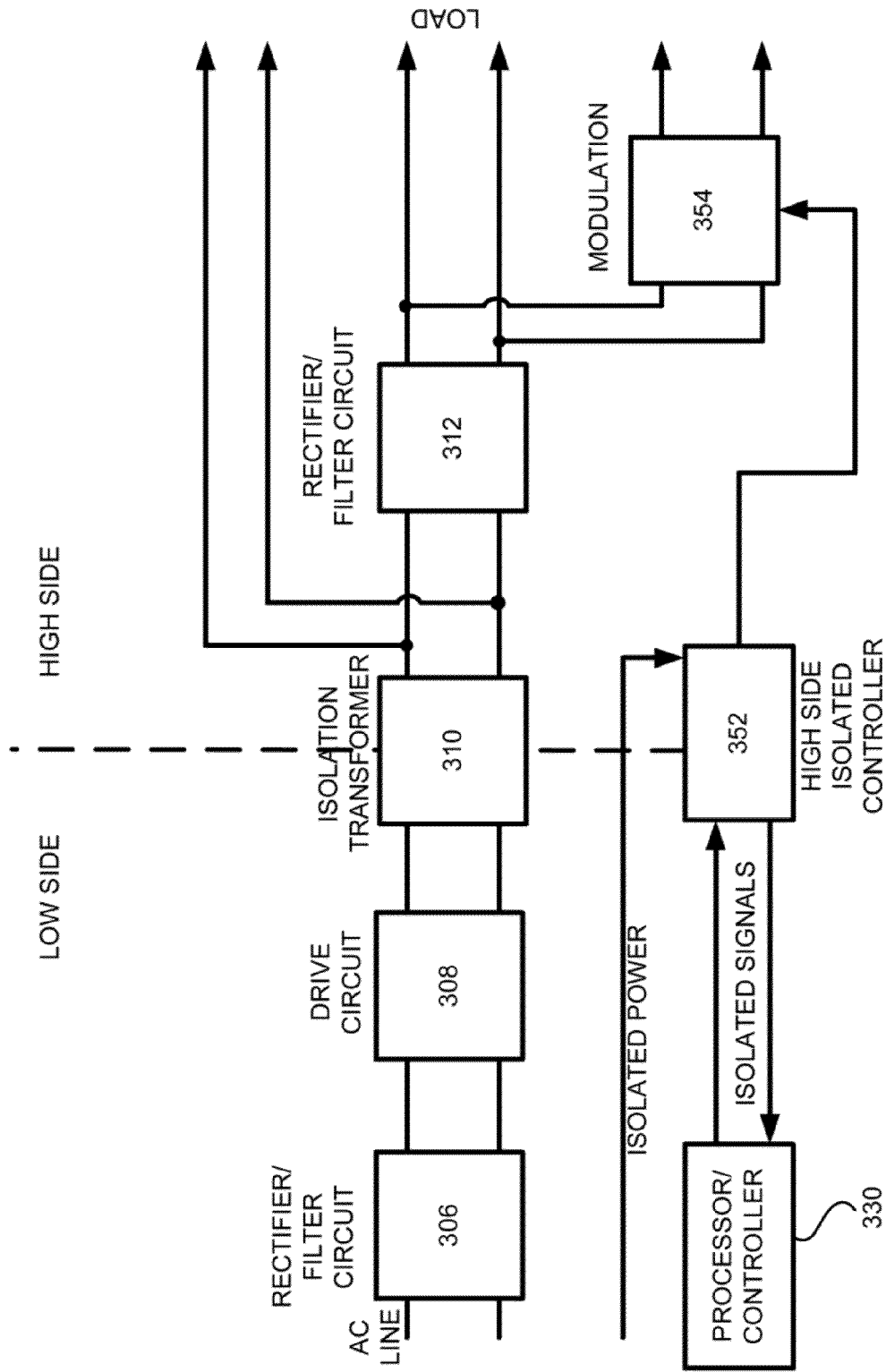

FIGS. 3A-3C show, in accordance with embodiments of the invention, some example control schemes. In these circuits, three load options are shown and the current may be delivered to the load (see right side of the figure) alternatively (one option at a time or concurrently (2 or more options simultaneously). Further, power factor correction circuitry (not shown) may be employed with one or more of FIGS. 3A-3C. Generally speaking, one or both of low-side and high-side (e.g. secondary winding 236 and circuitry toward the high frequency RF side of FIG. 2) control schemes are possible. In FIG. 3A, no active control is provided with either the rectifier/filter circuit (e.g., 306), the driver circuit (e.g., 308) or to the high-side modulation circuit (314).

However, as with all of FIGS. 3A-3C and with other implementations, it is possible to control the delivery of the AC source power signal. For example, an appropriately isolated (e.g., using, opto-isolation) temperature sensing signal may be provided to a source power signal control circuit to turn on and off the AC source power signal to control the temperature of a chuck. In the chuck example, since the thermal mass is fairly high, even simple on/off control of the AC source power signal (as opposed to proportional) has the potential of producing good performance. This is particularly true if the AC source power signal is controlled using a microprocessor that can rapidly cycle the AC source power signal on/off.

In FIG. 3B, low side control is implemented. In FIG. 3B, a microprocessor control unit 320 may be employed to control the rectifier/filter circuit (e.g., rectifier/filter circuit 306) to regulate the amplitude of the DC output signal. Alternatively or additionally, microprocessor control unit 320 may be employed to change the switching characteristics, the pulse width duration, and/or the operating frequencies of the switch mode power supply and/or other characteristics of driver circuit 308. As another example, processor/controller unit 320 may be employed to change tap points on the transformer primary, thereby effectively changing the turn ratio of isolation transformer 310.

In FIG. 3C, high side control is implemented. In this case, a high-side temperature sensor may send isolated sensor signals (e.g., opto-isolated or low power filtering) to a processor/controller unit 330, which then issues commands (which may also be isolated using, for example, opto-isolation or low power filtering) to a high-side isolated controller 352 to control the high-side modulation circuit 354. In the example of FIG. 3C, house-keeping voltages and currents for high-side modulation controller may be supplied using an isolated power signal from the low-side.

As can be appreciated from the foregoing, embodiments of the invention substantially obviate the frequency dependency of the prior art filtering approach as well as the difficulties with matching passive filter components inherent in that approach. The resonance problem associated with the prior art filtering approach is also substantially eliminated. By using an intermediate frequency with the isolation transformer, it is possible to substantially shrink the physical size of the isolation transformer. By appropriately designing the isolation transformer to provide a high degree of RF isolation while presenting a high impedance to all high RF frequencies of interest, it is possible to efficiently provide power from an AC source or a DC source to a component or assembly that is also coupled to a high RF signal.

While this invention has been described in terms of several preferred embodiments, there are alterations, permutations, and equivalents, which fall within the scope of this invention. Although various examples are provided herein, it is intended that these examples be illustrative and not limiting with respect to the invention. Also, the title is provided herein for convenience and should not be used to construe the scope of the invention herein. If the term "set" is employed herein, such term is intended to have its commonly understood mathematical meaning to cover zero, one, or more than one member. It should also be noted that there are runny alternative ways of implementing the methods and apparatuses of the present invention.

What is claimed is:

1. A method for providing isolated power to a component of a plasma processing chamber-that is also subject to a set of RF signals, said set of RF signals including at least a first RF signal having a first RF frequency, comprising:
   providing a DC voltage signal;
   modulating said DC voltage signal into an isolated power signal using an isolation transformer, said isolated power signal having an intermediate frequency that is higher than 60 Hz and lower than said first RF frequency, wherein said set of RF signals includes a plurality of RF signals having different RF frequencies, said first RF frequency representing the lowest RF frequency among said different RF frequencies, said isolation transformer having a primary winding that is not electrically connected to a secondary winding, including:
   supplying said DC voltage signal to said primary winding, and
   obtaining said isolated power signal from said secondary winding, thereby substantially blocking said first RF frequency; and
   delivering said isolated power to said component using said isolated power signal;
   wherein said secondary winding is wound with a larger diameter around a core of said isolation transformer resulting in an air gap between said secondary winding and said core for reducing the capacitive coupling between said secondary winding and said core than a diameter with which said primary winding is wound around said core.

2. The method of claim 1 further comprising:
   obtaining an AC line signal having a frequency in the range of 50 Hz to 60 Hz; and
   rectifying said AC line signal to obtain said DC voltage signal.

3. The method of claim 1 further comprising providing an electrostatic shield between said secondary winding and said core.

4. The method of claim 1 further comprising providing an electrostatic shield between said secondary winding and said primary winding.

5. The method of claim 1 wherein said secondary winding is wound over said primary winding.

6. The method of claim 5 further comprising providing an electrostatic shield between said secondary winding and said primary winding.

7. The method of claim 1 wherein said intermediate frequency is between about 500 Hz and about 2 MHz.

8. The method of claim 1 wherein said core is formed of a core material having a mu value between about 10 and about 5000.

9. The method of claim 1 further comprising providing a low-side control circuit for controlling at least one of an amplitude of said DC voltage signal and a turn ratio of said isolation transformer.

10. The method of claim 1 further comprising providing a modulation circuit for modulating said isolated power signal.

11. The method of claim 10 further comprising providing a high-side control circuit for controlling said modulation circuit.

12. A system for providing isolated power to a component that is also subject to a set of RF signals, said set of RF signals including at least a first RF signal having a first RF frequency, comprising:
   first and second terminals for providing a DC voltage signal; and
   a modulating circuit to modulate said DC voltage signal into an isolated power signal using an isolation transformer, said isolated power signal having an intermediate frequency that is higher than 60 Hz and lower than said first RF frequency, wherein said set of RF signals includes a plurality of RF signals having different RF frequencies, said first RF frequency representing the lowest RF frequency among said different RF frequencies, said isolation transformer having a primary winding that is not electrically connected to a secondary winding, wherein said DC voltage signal is supplied to said primary winding and said isolated power signal is obtained from said secondary winding thereby substantially blocking said first RF frequency, wherein said isolated power is delivered to said component using said isolated power signal, wherein said secondary winding is wound with a larger diameter around a core of said isolation transformer resulting in an air gap between said secondary winding and said core for reducing the capacitive coupling between said secondary winding and said core than a diameter with which said primary winding is wound around said core.

13. The system of claim 12 further comprising an electrostatic shield between said secondary winding and said primary winding.

14. The system of claim 12 further providing an electrostatic shield between said secondary winding and said core.

15. The system of claim 12 wherein said secondary winding is wound over said primary winding.

16. The system of claim 15 further providing an electrostatic shield between said secondary winding and said primary winding.

17. A method for providing isolated power to a component of a plasma processing chamber that is also subject to a plurality of RF signals, said plurality of RF signals including at least a first RF signal having a first RF frequency, said method comprising:
   providing an AC line signal having a frequency in the range of 50 Hz to 60 Hz;
   rectifying said AC line signal to obtain a quasi-DC voltage signal;
   modulating said quasi-DC voltage signal into an isolated power signal using an isolation transformer, said isolated power signal having an intermediate frequency that is higher than 60 Hz and lower than said first RF frequency, said first RF frequency representing the lowest RF frequency among all RF frequencies of said plurality of RF signals, said isolation transformer having a primary winding that is not electrically connected to a secondary winding, including:
   supplying said quasi-DC voltage signal to said primary winding, and
   obtaining said isolated power signal from said secondary winding, thereby substantially blocking said first RF frequency;
   wherein said secondary winding is wound with a larger diameter around a core of said isolation transformer resulting in an air gap between said secondary winding and said core for reducing the capacitive coupling between said secondary winding and said core than a diameter with which said primary winding is wound around said core; and
   delivering said isolated power to said component of said plasma processing chamber using said isolated power signal.

* * * * *